United States Patent
Criscuolo

(10) Patent No.: US 10,351,483 B2
(45) Date of Patent: Jul. 16, 2019

(54) SLOW-RELEASE FERTILIZER COMPOSITION AND PREPARATION METHOD

(71) Applicant: Upcycle and Company, LLC, San Diego, CA (US)

(72) Inventor: Jared Robinson Criscuolo, San Diego, CA (US)

(73) Assignee: Upcycle and Company, LLC, San Diego, CA (US)

( * ) Notice: Subject to any disclaimer, the term of this patent is extended or adjusted under 35 U.S.C. 154(b) by 0 days.

(21) Appl. No.: 15/449,682

(22) Filed: Mar. 3, 2017

(65) Prior Publication Data

US 2018/0251408 A1 Sep. 6, 2018

(51) Int. Cl.
- *C05F 5/00* (2006.01)
- *C05B 17/00* (2006.01)
- *C05F 17/00* (2006.01)

(52) U.S. Cl.
CPC .............. *C05F 5/008* (2013.01); *C05B 17/00* (2013.01); *C05F 17/00* (2013.01); *Y02A 40/212* (2018.01); *Y02P 20/145* (2015.11); *Y02W 30/43* (2015.05); *Y02W 30/47* (2015.05)

(58) Field of Classification Search
None
See application file for complete search history.

(56) References Cited

U.S. PATENT DOCUMENTS

| 2011/0247378 A1* | 10/2011 | Begley | C05C 1/00 71/8 |
| 2014/0223981 A1* | 8/2014 | Hatcher | C05C 11/00 71/23 |
| 2015/0274605 A1* | 10/2015 | Waldron | C05F 5/008 71/8 |
| 2017/0283337 A1* | 10/2017 | Gaunt | C05F 17/0036 |

FOREIGN PATENT DOCUMENTS

| JP | 2000185992 A | * | 7/2000 |
| JP | 104355802 | * | 2/2015 |

\* cited by examiner

*Primary Examiner* — Wayne A Langel
(74) *Attorney, Agent, or Firm* — MU P.C.

(57) ABSTRACT

A method of making the slow-release fertilizer and the composition thereof includes the steps of adding Class A Exceptional Quality biosolids at a percentage-by-weight of 35% to 75%, brewing grains at a percentage-by-weight of 10% to 50%, and dried algae at a percentage-by-weight of 5% to 20%. Biosolids are digested in an anaerobic digester for 15 days. Biosolids are dried to a moisture content under 6% and brewing grains and algae are dried to a moisture content under 10%. Algae is pressed to isolate the dried algae cell wall. The algae is dried to a moisture content under 10%. The Class A Exceptional Quality biosolids, brewing grains, and algae cell wall are pulverized to a mesh size between 100 to 300 and blended according to the above proportions.

20 Claims, 1 Drawing Sheet

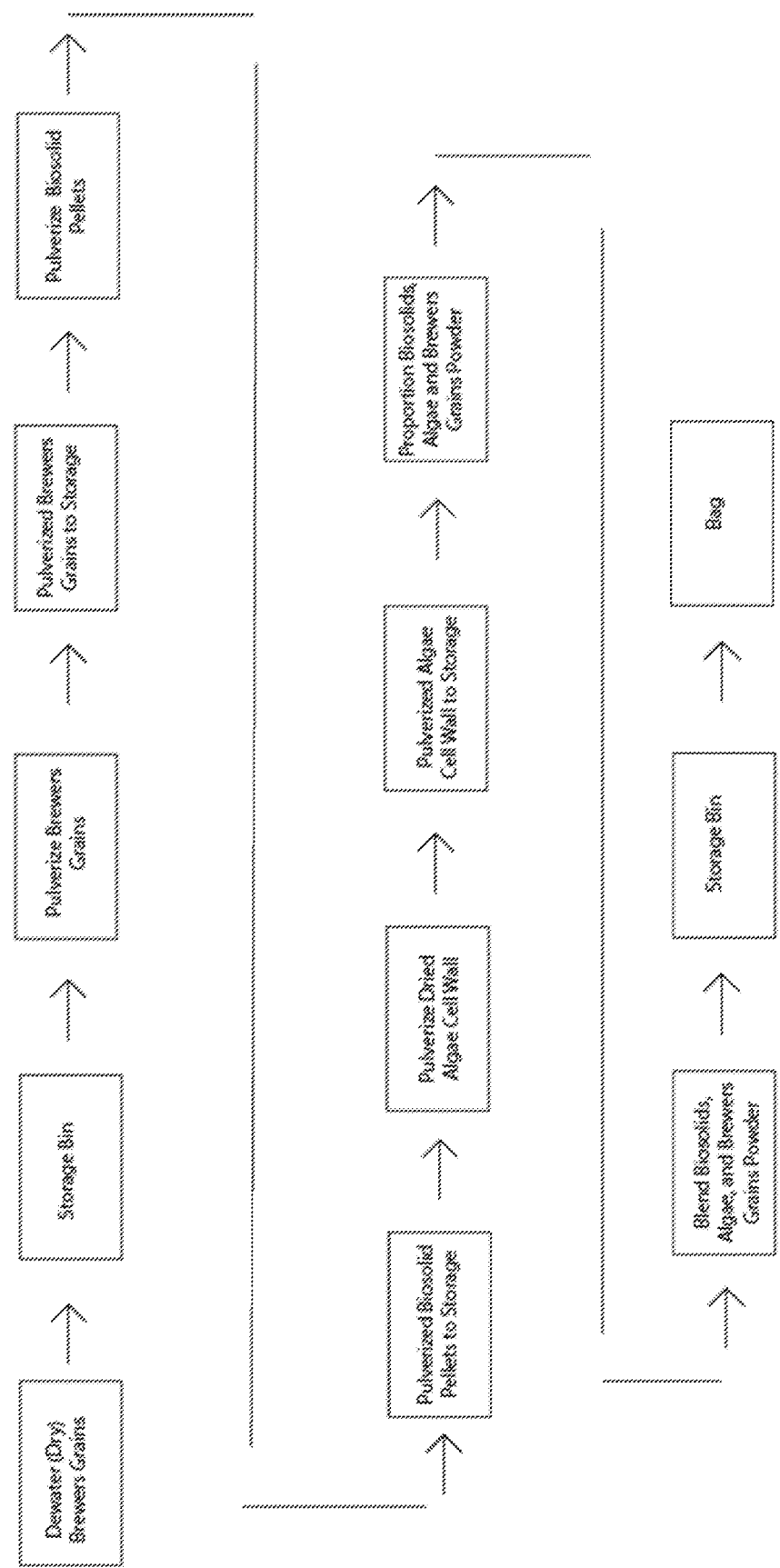

SLOW-RELEASE FERTILIZER COMPOSITION AND PREPARATION METHOD

BACKGROUND OF THE INVENTION

1. Field of Invention

The present invention relates to the field of fertilizer compositions and more specifically to the field of methods of producing a fertilizer composition.

2. Description of Related Art

Plants, and for that matter all living things, require nitrogen, among other micronutrients, to survive and grow. This is because nitrogen is an essential building block of amino acids, which are in turn the building blocks of proteins. Plants are unable to utilize the di-nitrogen that is readily available in the earth's atmosphere. Instead, they require nitrate or ammonium that can be found in soil. Di-nitrogen from the atmosphere can be converted into soil by a process known as nitrogen fixation. This occurs naturally by lightning strikes, precipitation, and a symbiotic relationship with nitrogen fixing bacteria. Alternatively, man-made fertilizers can utilize the Haber process to produce ammonium.

During the agricultural process, plants utilize the readily available soil nitrogen as they grow. Once the crop is harvested the soil is left depleted of its available nitrogen. This nitrogen must be replaced before a new crop is planted, to ensure the preceding crop has proper available nutrition. To compensate for the lack of nitrogen, farmers have a few options. They can elect to use crop-rotation techniques such as using legumes to help fertilize the soil for future crops. Alternatively, they can elect to fertilize the soil with man-made fertilizers as discussed above.

The widespread use of fertilizers comes with a multitude of inherent problems. First, if the fertilizer contains hazardous chemicals or additives, these can be washed away by irrigation, and sent to downstream collection sites. Second, organic fertilizers often require significantly greater volume application of fertilizers as compared to conventional chemical based fertilizers. This excessive application often leads to runoff and pollution of important sources of downstream surface and subsurface drinking water. This causes large concentrations of toxins and excess nutrients to be present in areas where they should not, as well as cause algae blooms in bodies of water that decimate aquatic life. Less harmful techniques have been developed that recycle organic waste from sewage and industry. If treated properly, these waste materials can be used to address the metabolic needs of plants as well as ensure the safety of the public.

Biosolids, such as anaerobically-digested municipal sewage. This process uses facultative bacteria under anaerobic conditions to decompose the organic and bacterial matter within the biosolids. These are typically classified as "Class B" as they may contain pathogens after digestion by the bacteria. In contrast, "Class A" biosolids are heat dried and are more favorable in their usage for animal and human crop growth. "Class A Exceptional Quality" have undergone additional treatment and are granted the classification of "unrestricted use" as a soil amendment and fertilizer. To acquire this certification, the process must be proven to remove enteric viruses, bacteria, and other pathogens. Drying the biosolids wherein the total composition of moisture is less than 10% has the negative of lower fertilization value because nitrogen content is only 2% to 5%. As market value for fertilizer is principally based on nitrogen content, raising the nitrogen concentration is favorable for the plants as well as the business. Methods disclosed herein function to benefit the growth of plants, as well as the health of the environment and community.

Based on the foregoing, there is a need in the art for a safe, economical, and effective means of producing a non-toxic fertilizer to be used in the agricultural and home and garden industries. The fertilizer must combine multiple ingredients evenly and consistently and allow for the use in conjunction with a hydroponics system.

SUMMARY OF THE INVENTION

A method of making a slow-release fertilizer composition comprising the steps of adding biosolids at a percentage by weight of 35% to 75%, adding brewing grains at a percentage by weight of 10% to 50%, and dried algae cell wall at a percentage by weight of 5% to 25%. The biosolids, brewing grains, and dried algae cell wall are blended. At least 15% of a nutrient content of the composition does not become biologically active immediately after administration of the composition.

Biosolids are first digested in an anaerobic digester for a minimum of 15 days and then dried to a moisture content of 6% or less. In an embodiment, the biosolids are passed through a heating source per US EPA 40 CFR 503 Class A Exceptional Quality standards. The biosolids are treated with a vegetable oil based additive to prevent billowing and then pulverized to a mesh size between 100 and 300.

Brewing grains are dewatered to a moisture content of 10% or less. The brewing grains are further dried at a temperature between 155° F. and 250° F. The brewing grains are then pulverized to a mesh size between 100 to 300.

In an embodiment, algae is pressed to isolate the dried algae cell wall. The dried algae cell wall is then pulverized to a mesh size of 100 to 300 and dried to a moisture content of less than 10%.

A composition is disclosed for a slow release fertilizer wherein the composition results in at least 15% of a nutrient content of the composition becomes biologically active after administration of the composition. In an embodiment, the composition is comprised of 35% to 75% biosolids, 10% to 50% brewing grains, and 5% to 25% brewing grains.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 1 is a flowchart of the method of production, according to an embodiment of the present invention.

DETAILED DESCRIPTION OF PREFERRED EMBODIMENTS

Preferred embodiments of the present invention and their advantages may be understood by referring to FIG. 1, wherein like reference numerals refer to like elements.

In general, the invention described herein refers to a fertilizer composition and the method of production thereof. In an embodiment, biosolids, spent brewers grains, and algae cell wall are collected, treated, and mixed to specific ratios to form a slow release fertilizer. Slow release is defined as a fertilizer wherein a minimum of 15% of total nitrogen, potassium, and phosphorous is biologically unavailable at the initial application. Preferentially, biosolids are sourced from an Environmental Protection Agency (EPA) Class A exceptional quality rated facilities, with a pretreatment program in place to monitor any potential chemical inputs at concentrations that may be detrimental to soil and human health. To achieve exceptional quality status, the provider must not only meet, but exceed all standards for Class A biosolids including pathogen, metal, and vector attraction reduction parameters.

Components of the composition are collected from one or more sources. Typically, components such as brewers grains and algae are received having a high moisture content that can result in rampant mold growth or decomposition, thus spoiling the component. To dry, a number of methods can be used as described herein. Heat, if used, is kept below 250° F. to prevent burning and to keep the total and available nutrients and compounds intact.

In reference to FIG. 1, a method of preparation is illustrated in a preferred embodiment of the invention. Spent brewers grains comprising; malted barley, wheat, maize, corn, rice, sorghum, yeast, and millet, are collected from one or more sources and dried to a moisture content of 10% or less. The dewatering process can be accomplished by one or more ways as known in the art, such as centrifugation, heat, and evaporation. Once the desired moisture content is reached, the brewers grains are transferred to a storage bin such as a Super Sack to be transferred to a Super Sack unloading machine. Dried brewers grains are then conveyed via a screw auger into a pulverizer to render the dried grains into a fine powder, between 100-300 mesh size.

Brewers grains typically arrive with a moisture content near 80%. In an embodiment, brewers grains are dewatered using any combination of the following: a centrifuge, a rotary drum, a heat exchanger, roaster, dehydrator, solar drying pad, or other tools known in the art. Drying of brewers grains must be done rapidly to avoid mold development and natural decomposition. Brewers grains should be prepared in this manner to maintain a moisture content is below 10%. In an embodiment, grains are pulverized to at least 100 mesh size and up to 300 mesh size to ensure even blending.

In an embodiment, biosolid pellets are loaded into the super sack unloading machine and are then conveyed by screw auger into the pulverizer. The pulverized biosolids are conveyed to a separate super sack for storage prior to a blending stage.

In an embodiment, manure and biosolids must meet the United States Environmental Protection Agencies (EPA) treatment standards for Class A Exceptional Quality. Further, manure is sourced from farms that allow animals free range and eating a natural diet. Biosolids are sourced from wastewater agencies that have 95% or greater residential customer base, and minimal toxic industrial and commercial customers. Per US Environmental Protection Agency 40 CFR 503 regulations for Class A Exceptional Quality biosolids, sewage sludge is digested in an anaerobic (digester) fermenter, moved to a centrifuge for dewatering, and transferred through a heat source to ensure pathogen reduction and elimination, uniform size, and dewatering. Final moisture content is 6% or less. Dried pellets are treated with a vegetable oil based additive to prevent billowing of dust when they are transported and moved between containers and spaces. The dried pellets are then pulverized to at least 100 mesh size and up to 300 mesh size powder to be blended into the final fertilizer composition.

In an embodiment, a super sack containing dried algae cell wall is loaded into a super sack unloading machine and conveyed via a screw auger to a pulverizer. In an embodiment, dried algae are preprocessed to move through the screw auger without clogging. Pulverized algae are then conveyed into another super sack for storage prior to blending.

In an embodiment, the algae is harvested from a system that captures carbon dioxide, soot, heat, and other exhaust from coal fired power plants, or other sources of burned biomass, mined materials, timber, or natural resources. In an embodiment, the algae are pressed to extract lipids, leaving the algae cell wall post lipid extraction, thus isolating the algae cell wall. The retained algae cell wall is dehydrated using processes known in the art such that nutrient content is preserved.

Each of the super sacks containing the dried brewers grain, pulverized biosolids, and pulverized algae cell wall are loaded into weighing and proportioning equipment as known in the art. Each component is mixed uniformly, which is more easily accomplished due to the drying and pulverizing pretreatment. Once fully blended, fertilizer composition is placed in a super sack storage container before allocation into marketable volumes.

In an embodiment, the final blend is comprised of biosolids at a range of 35% to 75% by weight, brewing grains at a range of 10% to 50% by weight, and dried algae cell wall at a range of 5% to 25% by weight.

In preferred embodiment, the blend is comprised of; 55% EPA Class A exceptional quality biosolids, 30% dried brewers grains, and 15% dried algae cell wall. It is noted that this blend allows for faster metabolic breakdown and nutrient uptake by the crops. The specific blend, and mesh size of 100-300 allows for the composition to be utilized in a hydroponic system, wherein the composition is suspended in water and pumped through the hydroponic irrigation system.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method of making a slow-release fertilizer composition comprising the steps of:
   a. adding biosolids at a percentage-by-weight of 35% to 75%;
   b. adding brewing grains at a percentage-by-weight of 10% to 50%;
   c. adding dried algae cell wall at a percentage-by-weight of 5% to 25%;
   d. blending the biosolids, the brewers grains, and the dried algae cell wall, and
   wherein at least 15% of a nutrient content of the composition becomes biologically active after administration of the composition.

2. The method of claim 1, including the step of digesting the biosolids in an anaerobic digester for 15 days.

3. The method of claim 1, including the step of dewatering the biosolids to a moisture content of 6% or less.

4. The method of claim 1, including the step of pulverizing the biosolids to a mesh size between 100 and 300.

5. The method of claim 1, including the step of dewatering the brewing grains to a moisture content of 10% or less.

6. The method of claim 5, including the step of drying the brewing grains at a temperature between 155° F. and 250° F.

7. The method of claim 1, including the step of pulverizing the brewing grains to a mesh size of 100 to 300.

8. The method of claim 7, including the step of treating the brewing grains with an oil based additive, wherein the oil based additive prevents billowing.

9. The method of claim 1, wherein the brewing grains are passed through a heating source per US EPA 40 CFR 503 Class A Exceptional Quality standards.

10. The method of claim 1, including the step of pressing algae to isolate the dried algae cell wall, wherein the dried algae cell wall is pulverized to a mesh size of 100 to 300, and wherein the dried algae cell wall is dried to a moisture content of less than 10%.

11. A composition of a slow-release fertilizer comprising:
  a. biosolids at a final percentage-by-weight of 35% to 75%;
  b. brewing grains at a final percentage-by-weight of 10% to 50%;
  c. dried algae cell wall at a final percentage-by-weight of 5% to 25%;
wherein at least 15% of a nutrient content of the composition becomes biologically available after administration of the composition.

12. The composition of claim 11, wherein the biosolids are digested in an anaerobic digester for 15 days.

13. The composition of claim 11, wherein the biosolids are dewatered to a moisture content under 6%.

14. The composition of claim 11, wherein the biosolids are pulverized to a mesh size between 100 and 300.

15. The composition of claim 11, wherein the brewing grains are dewatered to a moisture content below 10%.

16. The composition of claim 15, wherein the brewing grains are dried at a temperature between 155° F. and 250° F.

17. The composition of claim 11, wherein the brewing grains are pulverized to a mesh size of 100 to 300.

18. The composition of claim 17, wherein the brewing grains are treated with an oil based additive, wherein the oil based additive prevents billowing.

19. The composition of claim 11, wherein the brewing grains are passed through a heating source per US EPA 40 CFR 503 Class A Exceptional Quality standards.

20. The composition of claim 11, wherein algae is pressed to isolate the dried algae cell wall, wherein the dried algae cell wall is pulverized to a mesh size of 100 to 300, and wherein the dried algae cell wall is dried to a moisture content of less than 10%.

* * * * *